(12) United States Patent  
Swain

(10) Patent No.: US 11,548,555 B2  
(45) Date of Patent: Jan. 10, 2023

(54) ELECTRIC CAR SUB-FRAME

(71) Applicant: RBW Sports & Classics Ltd, Staffordshire (GB)

(72) Inventor: Peter Swain, Staffordshire (GB)

(73) Assignee: RBW Sports & Classics Ltd., Staffordshire (GB)

( * ) Notice: Subject to any disclaimer, the term of this patent is extended or adjusted under 35 U.S.C. 154(b) by 287 days.

(21) Appl. No.: 15/930,482

(22) Filed: May 13, 2020

(65) Prior Publication Data

US 2020/0361536 A1   Nov. 19, 2020

(30) Foreign Application Priority Data

May 13, 2019   (GB) ..................................... 1906698

(51) Int. Cl.
| | |
|---|---|
| *B62D 21/11* | (2006.01) |
| *B60L 50/60* | (2019.01) |
| *B60G 3/20* | (2006.01) |
| *B60G 11/02* | (2006.01) |
| *B60K 1/00* | (2006.01) |

(Continued)

(52) U.S. Cl.
CPC ............. *B62D 21/11* (2013.01); *B60G 3/20* (2013.01); *B60G 11/02* (2013.01); *B60K 1/00* (2013.01); *B60L 50/60* (2019.02); *B62D 65/10* (2013.01); *B60G 2204/14* (2013.01); *B60G 2204/41* (2013.01); *B60R 16/0207* (2013.01)

(58) Field of Classification Search
CPC ......... B62D 21/11; B62D 65/10; B60L 50/60; B60G 3/20; B60G 11/02; B60G 2204/14; B60G 2204/41; B60K 1/00; B60R 16/0207

USPC ................................... 180/291; 280/124.109
See application file for complete search history.

(56) References Cited

U.S. PATENT DOCUMENTS 5,562,178 A * 10/1996 Worden .................... B60K 1/00  
                                                                             180/65.6  
6,357,769 B1 * 3/2002 Omundson .......... B60G 11/465  
                                                                              280/798

(Continued)

FOREIGN PATENT DOCUMENTS

| CN | 106004290 | 12/2018 |
|---|---|---|
| DE | 102010017991 | 10/2011 |

(Continued)

*Primary Examiner* — Paul N Dickson  
*Assistant Examiner* — Caitlin Anne Miller  
(74) *Attorney, Agent, or Firm* — Renner, Kenner, Greive, Bobak, Taylor & Weber

(57) ABSTRACT

A sub-frame arranged to be mounted on a chassis of a car and to have the rear wheels of the car mounted thereon is arranged to receive an electric drivetrain arranged to drive the car. The sub-frame includes a cage including bars arranged to form an upper perimeter and a lower perimeter and a plurality of struts extending between the upper and lower perimeters; a pair of rear wheel suspension mounts, each rear wheel suspension mount being arranged to have one of the rear wheels of the car mounted thereon; and a plurality of brackets located on the cage and arranged to facilitate connection of the sub-frame to the chassis of the car and/or to the electric drivetrain. A frame and vehicle including such a sub-frame and a method of installing such a sub-frame are also disclosed.

17 Claims, 6 Drawing Sheets

(51) Int. Cl.
    *B62D 65/10*    (2006.01)
    *B60R 16/02*    (2006.01)

(56)             References Cited

U.S. PATENT DOCUMENTS 7,874,395 B2 *   1/2011  Taji .................... B60K 1/00
                                                       180/300
    10,183,698 B2 *  1/2019  Ta ..................... B62D 21/12
    10,435,075 B2 * 10/2019  Lorenz ................. B60G 3/18
    2015/0122561 A1 * 5/2015 Kashiwai .............. B60K 1/00
                                                       180/65.6
    2015/0283889 A1 * 10/2015 Agnew ................ B60K 1/00
                                                       180/292
    2019/0366834 A1 * 12/2019 Nagpal .............. B60G 21/055

FOREIGN PATENT DOCUMENTS

DE      102014102541       8/2015
    EP           2210757       7/2010
    EP          28735444       5/2015
    FR           2975350      11/2012
    WO        2015157263      10/2015
    WO        2018041471       3/2018

* cited by examiner

ELECTRIC CAR SUB-FRAME

The invention relates to a sub-frame for use in a car; the sub-frame is arranged to be mounted within a rear portion of the car, and to receive and support an electric drivetrain for the car, so allowing an internal combustion engine-powered car to be converted into an electric car. In particular, the sub-frame disclosed herein may facilitate retrofitting of electric drive architecture in a classic car without requiring modification to the classic car frame or bodywork.

As used herein, a car means a road vehicle, typically having four wheels, able to carry at least two people. Child's toy cars, collector's model vehicles, and the likes are not intended to be covered by the word "car".

As used herein, a "petrol or diesel car" means a car initially intended or designed to be powered by an internal combustion engine fueled by petrol or diesel (or an equivalent), whether or not an internal combustion engine and/or fuel tank is present in the car.

A chassis, also referred to as a vehicle frame, is the main supporting structure of a motor vehicle, to which all other components may be attached. The vehicle frame or chassis can be thought of as a skeleton of the vehicle.

Until the 1930s, most cars had a structural frame separate from the body of the car (body-on-frame construction, the chassis generally being roughly ladder-shaped and optionally referred to as a ladder-frame). A body shell may then be bolted onto the ladder frame. In more modern cars, the chassis and bodywork are often integrated into one component (unibody construction
  the unibody frame may be thought of as comprising an integrated ladder frame and body shell)
    the chassis/vehicle frame therefore may or may not include bodywork depending on car design. The chassis supports components added to the vehicle (e.g. wheels, drivetrain, etc.) and contributes to the vehicle's rigidity. Most of the cars mentioned herein are unibody, although the skilled person would appreciate that a sub-frame as described herein could also be used with a ladder chassis/frame.

According to a first aspect of the invention, there is provided a sub-frame arranged to be mounted on a chassis of a car and to have the rear wheels of the car mounted thereon, the sub-frame being arranged to receive an electric drivetrain arranged to drive the car.

The sub-frame may comprise:
a cage comprising bars arranged to form an upper perimeter and a lower perimeter and a plurality of struts extending between the upper and lower perimeters;
a pair of rear wheel suspension mounts, each rear wheel suspension mount being arranged to have one of the rear wheels of the car mounted thereon; and
a plurality of brackets located on the cage and arranged to facilitate connection of the sub-frame to the chassis of the car and to the electric drivetrain.

Each rear wheel suspension mount may comprise:
an upper control arm mounting point on the upper perimeter of the cage, the upper control arm mounting point arranged to have an upper control arm of a rear suspension assembly rotatably attached thereto; and
a lower control arm mounting point on the lower perimeter of the cage, the lower control arm mounting point arranged to have a lower control arm of the rear suspension assembly rotatably attached thereto.

Each control arm mounting point may comprise a rubber bushing arranged to provide an interface between a metal part of the control arm mounting point and the control arm whilst allowing relative rotation.

The plurality of brackets located on the cage may comprise one or more of:
a pair of front frame mounts extending forward from a front face of the sub-frame, and arranged to be connected to an underbody portion of the chassis; and/or
a pair of rear side frame mounts extending sideways from a rearward portion of the sub-frame and arranged to be connected to side rails of the chassis; and/or
a pair of front side frame mounts located forward of the rear side frame mounts, extending sideways from the sub-frame, and arranged to be connected to the side rails of the chassis.

Each front frame mount may be arranged to be connected to the underbody portion of the chassis in a front leaf spring attachment location. The skilled person would appreciate that not all cars have front leaf spring attachment locations, depending on whether or not they were initially designed to take leaf spring suspension assemblies. However, for cars originally designed to have leaf springs for the rear suspension, the attachment location intended for that leaf spring may advantageously be repurposed when retrofitting an electric drivetrain.

Some or all of the various mounts arranged for use in connecting the sub-frame to the chassis may comprise, or be arranged to receive, a bushing, so as to provide a bushed connection between the sub-frame and the chassis.

The plurality of brackets located on the cage may comprise:
one or more rearward drivetrain mounting brackets extending from a rearward portion of the cage and arranged to have the electric drivetrain connected thereto; and
one or more forward drivetrain mounting bracket extending from a forward portion of the cage and arranged to have the electric drivetrain connected thereto.

The sub-frame has a forward portion and a rearward portion; the width of the sub-frame in its forward portion may be less than 1025 mm and more than 300 mm, and optionally less than 1018 mm. The sub-frame has a length, between the front of the forward portion and the rear of the rearward portion—the length may be less than 675 mm and more than 200 mm, and optionally less than or equal to 637 mm.

The sub-frame has a height, between the top of the upper perimeter bars and the bottom of the lower perimeter bars—the height may be less than 325 mm and more than 100 mm, and optionally less than 308 mm.

The upper perimeter may be at least substantially square. The lower perimeter may be at least substantially trapezoidal. A forward edge of the lower perimeter may be parallel to and longer than the upper perimeter's forward edge. A rearward edge of the lower perimeter may be parallel to and at least substantially the same length as the upper perimeter's rearward edge.

The forward edges of the lower and upper perimeters may be vertically aligned.

The rearward edges of the upper and lower perimeters may be vertically offset, optionally due to the lower perimeter extending further rearward than the upper perimeter.

The cage may further comprise one or more bars extending across the upper perimeter.

According to a second aspect of the invention, there is provided a frame for a car, the frame comprising:

a chassis comprising a pair of front suspension mounts each arranged to have a front wheel mounted thereon; and a sub-frame mounted on the chassis and comprising a pair of rear suspension mounts each arranged to have a rear wheel mounted thereon, the sub-frame extending between the rear suspension mounts and being arranged to receive an electric drivetrain arranged to drive rotation of the rear wheels.

The sub-frame may be mounted on a rearward portion of the chassis. The sub-frame may be as described in the first aspect.

Each suspension mount may be arranged to have a suspension assembly mounted thereon, and the corresponding wheel may be arranged to be mounted on the suspension assembly.

The chassis may be a unibody chassis or a ladder frame chassis.

According to a third aspect of the invention, there is provided a car comprising:
 a chassis;
 a pair of front wheels mounted on the chassis;
 a sub-frame mounted on the chassis;
 a pair of rear wheels mounted on the sub-frame, the sub-frame extending between the rear wheels;
 an electric drivetrain mounted on the sub-frame and arranged to drive rotation of the pair of rear wheels; and
 a battery connected to, and arranged to power, the electric drivetrain.

The battery may be mounted on a forward region of the chassis, optionally adjacent the pair of front wheels and/or under a bonnet (hood) of the car.

The sub-frame may be as described with respect to the first aspect.

The car may further comprise a harness arranged to connect the battery to the electric drivetrain. The harness may conduct electricity from the battery to the drivetrain. The harness may be arranged to extend through a prop shaft tunnel of the car. The skilled person would appreciate that not all cars may have prop shaft tunnels, but that a tunnel or channel for the prop shaft extending from a forward region of a car to a rearward region is a common feature of rear-wheel or four-wheel drive cars designed to be powered by an engine located under the bonnet/hood, and that such an available tunnel may advantageously be repurposed when such a car is adapted to have an electric drivetrain.

According to a fourth aspect of the invention, there is provided a method of retro-fitting a petrol or diesel car with an electric drivetrain. The method comprises:
 mounting a sub-frame on a rearward portion of a chassis of the car,
 mounting an electric drivetrain arranged to drive rotation of rear wheels of the car within the sub-frame.

The sub-frame may comprise a pair of rear wheel suspension mounts, and the method may further comprise mounting a rear wheel of the car on each rear wheel suspension mount, optionally via a respective suspension assembly.

The method may further comprise:
 mounting a battery on a forward portion of the chassis of the car; and
 connecting the battery to the electric drivetrain such that the battery powers the electric drivetrain.

Optionally, the connecting the battery to the electric drivetrain may comprise positioning a harness along a portion of the length of the car between the battery and the drivetrain, and connecting the harness to the battery and to the drivetrain.

The sub-frame may be as described with respect to the first aspect.

Whilst the sub-frame described herein may be used in any petrol or diesel car (or equivalently in any car arranged to be driven by an internal combustion engine, irrespective of the fuel), the skilled person would appreciate that the ability to convert a car intended to run on petrol or diesel to run on electricity without changing the outward appearance of the vehicle may be of particular interest to owners, or would-be owners, of classic cars. As used herein, a "classic car" means a car designed or released in the period from 1948 to 1982, and in particular classic British sports cars, and newer cars made to those designs. Examples include:
 Jaguar XKE™ (1961-1974)
 Morgan Plus 4™ (1950-1961)
 Triumph Spitfire™ (1962-1980)
 MGA Roadster™ (1955-1962)
 AC Ace™ (1953-1963)
 Austin Healey 3000™ (1959-1967)
 Aston Martin DBS™ (1963-1965)

Other cars, such as the Ferrari F40™, Morris 8 Box Saloon™, may also be thought of as classic cars.

Keeping a car's "classic car" status whilst making modifications requires that the basic dimensions of the car remain the same. For example, the wheel base, track, ride height, width, and overall height and weight distributions should remain similar to those of the original vehicle. Keeping these dimensions as per the original vehicle keeps the overall appearance and stance of the original "Classic". The ability to retrofit an electric drivetrain without affecting the parameters listed above may therefore be of particular use to classic car owners and manufacturers.

The skilled person would understand that features described with respect to one aspect of the invention may be applied, mutatis mutandis, to any other aspect of the invention.

There now follows by way of example only a detailed description of embodiments of the present invention with reference to the accompanying drawings in which.

In the Figures, like or corresponding reference numerals are used for like or corresponding components.

Figure 1:
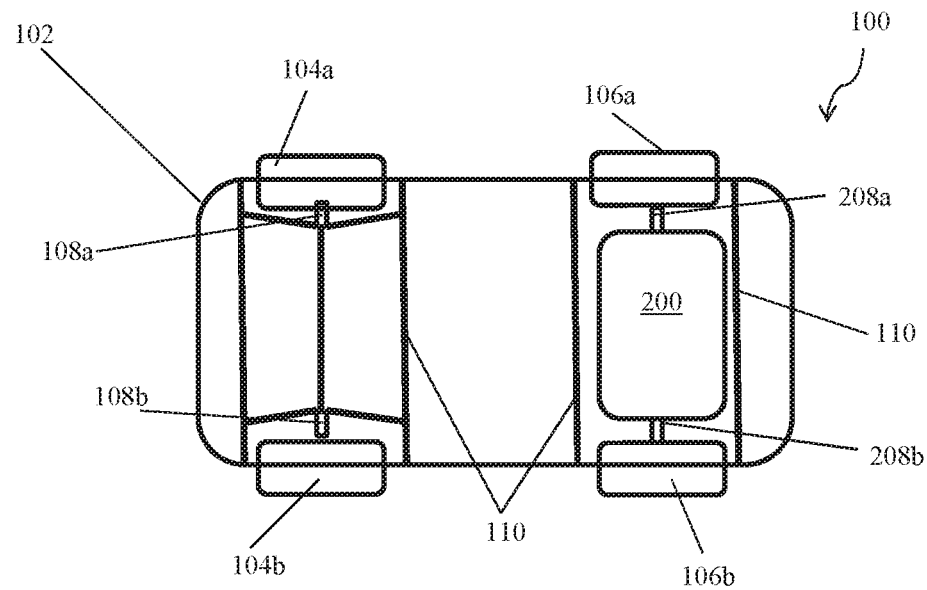
FIG. 1 is a schematic view of a portion of a car of an embodiment, including a ladder-frame portion of the chassis with a pair of front wheels, a pair of rear wheels and a sub-frame connected thereto.

FIG. 1 illustrates a schematic plan view of a portion of a vehicle 100. The vehicle 100 is a car, and more particularly is a classic car 100 in the embodiment being described. The skilled person would appreciate that other (non-classic) cars may be used in other embodiments.

The vehicle portion 100 comprises a chassis 102, a sub-frame 200, and four wheels 104, 106 mounted thereon.

The vehicle portion 100 comprises a pair of front wheel suspension mounts 108a, 108b arranged to mount the front wheels 104a, 104b onto the chassis 102.

Figure 2:
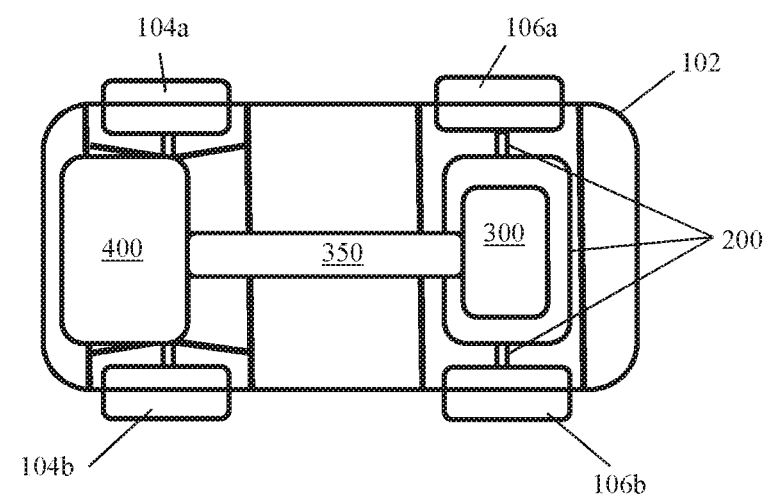
FIG. 2 is a schematic view corresponding to that shown in FIG. 1, additionally showing an electric drivetrain and battery.
Figure 7:
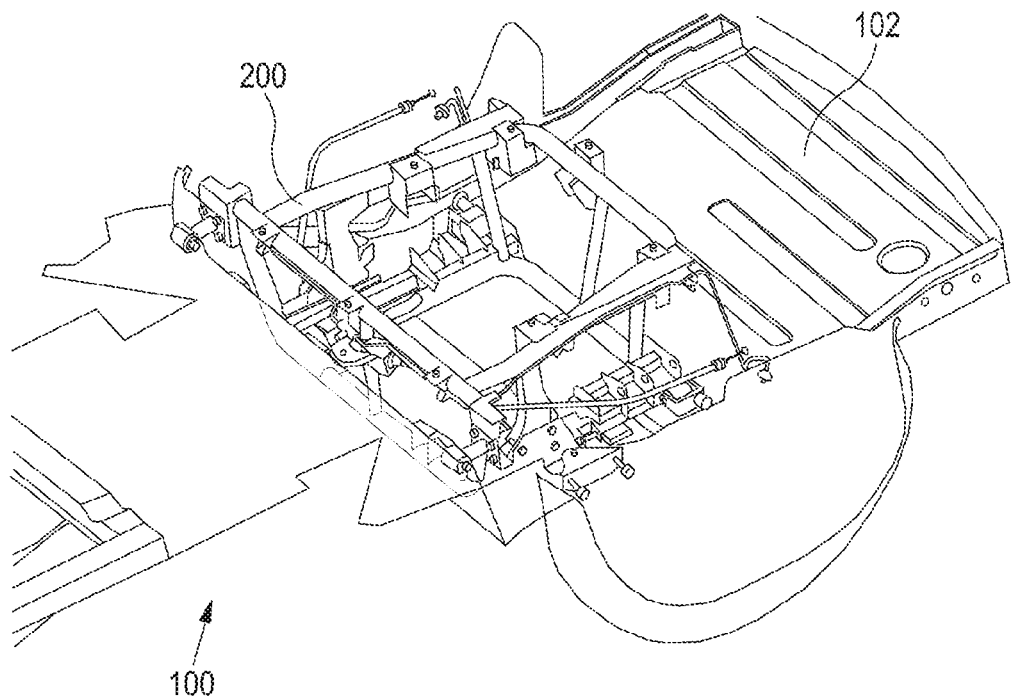
FIG. 7 is an underneath perspective view of a portion of a car of an embodiment, including a sub-frame of an embodiment.
Figure 8:
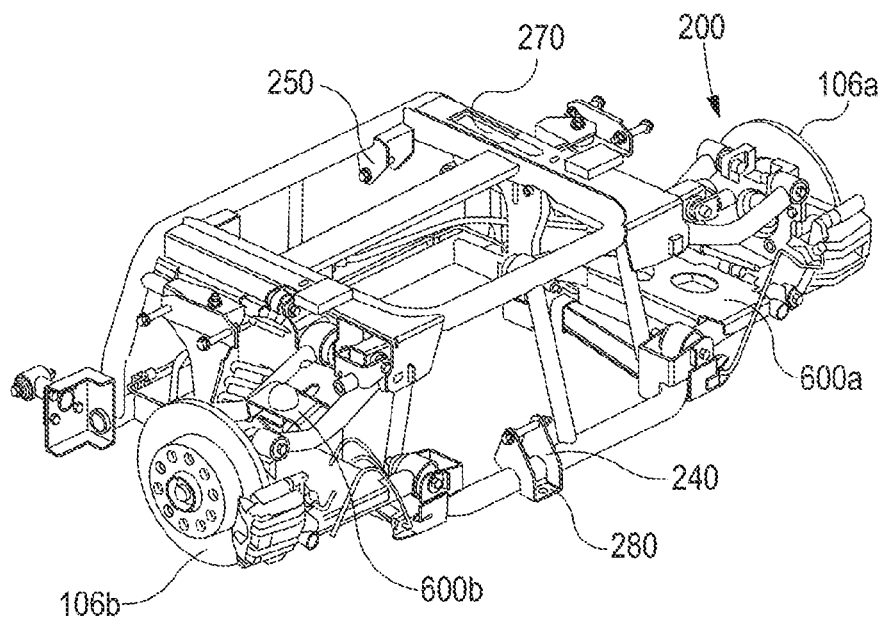
FIG. 8 is a rear perspective view of a sub-frame of an embodiment, with the rear wheel suspension mounted thereon.
Figure 9A:
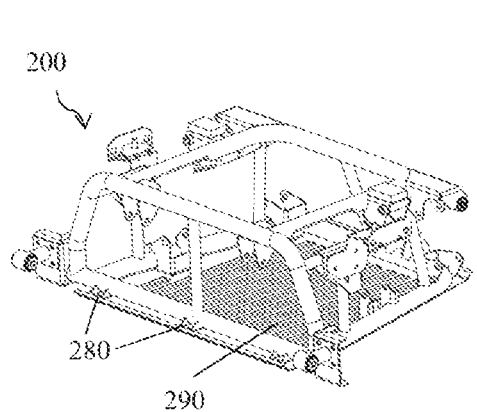
FIGS. 9A and 9B are perspective views of a sub-frame of an embodiment, including a base plate.
Figure 9B:
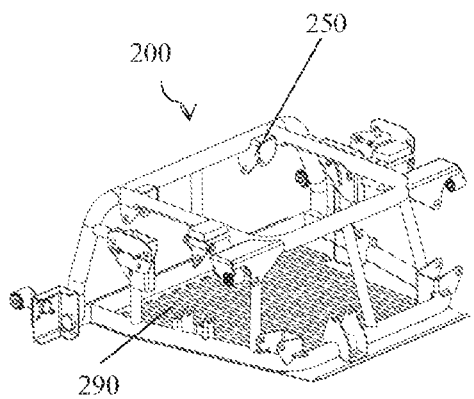

In the embodiment shown in FIGS. 1 and 2, the chassis 102 is a ladder-frame type chassis and comprises an outer perimeter and a plurality of cross-bars 110 extending across that outer perimeter. In alternative embodiments, alternative chassis designs may be used, such as unibody chassis designs. A ladder-frame type chassis is shown in FIGS. 1 and 2 for simplicity of representation only—a unibody chassis 102 is shown in FIG. 7.

The vehicle portion 100 comprises a pair of rear wheel suspension mounts 208a, 208b arranged to mount the rear wheels 106a, 106b onto the sub-frame 200. The sub-frame 200 is mounted on the chassis 102; the rear wheels 106a, 106b are therefore mounted on the chassis 102 via the sub-frame 200.

Figure 10A:
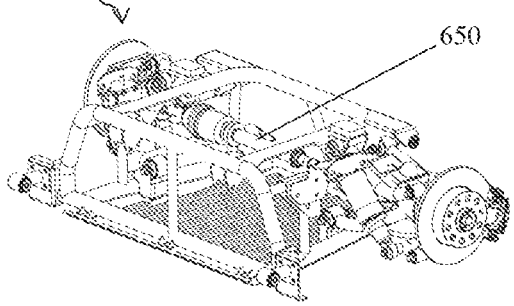
FIGS. 10A and 10B are perspective views of the sub-frame of FIGS. 9A and 9B, with a rear wheel suspension and mounting assembly mounted thereon.
Figure 10B:
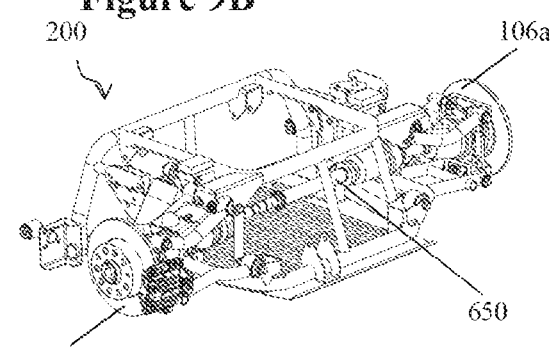

The sub-frame 200 is located towards the rear of the vehicle 100, and at least partially between the rear wheels 106 of the vehicle 100. The sub-frame 200 may therefore be described as being mounted on a rearward portion of the chassis 102—the rearward portion may be defined as being rearward of a half-way point along the length of the chassis 102, and/or adjacent the rear wheels 106. The sub-frame 200 extends between the rear wheels 106 and has the rear wheels 106 mounted thereon. In the embodiment being described, a rear axle 650 of the car 100 extends through the sub-frame 200 in use, as shown in FIGS. 10A and 10B.

The sub-frame 200 is arranged to receive an electric drivetrain 300 arranged to drive the classic car. The classic car 100 is a rear-wheel drive car in the embodiments being described; the drivetrain 300 therefore drives rotation of the rear wheels 106. In the embodiment being described, the drivetrain 300 comprises an EMR2 motor supplied by Zytek/Continental Engineering Services (http://www.zytekautomotive.co.uk/products/buy-direct-2/). In alternative embodiments, different drivetrains 300 may be used.

FIG. 2 illustrates the vehicle 100 with the electric drivetrain 300 shown schematically in situ within the sub-frame 200. A battery 400 is provided towards the front of the vehicle 100, in this case taking the place of the original engine block beneath the bonnet/hood. The battery 400 may therefore be described as being mounted on a forward portion of the chassis 102 of the car 100; the forward portion may be defined as being forward of a half-way point along the length of the chassis 102, and/or adjacent the front wheels 104.

Locating the drivetrain 300 separately from the battery 400 may facilitate retaining the original size and shape of the classic car 100, for example allowing sufficient space for the battery 400 without raising the car 100. A harness 350 extends between the battery 400 and the electric drivetrain 300, and is arranged to transfer power between the battery 400 and the electric drivetrain 300. The harness 350 may be or comprise a cable and one or more connectors. The harness 350 is arranged to extend along a portion of the length of the car 100 and centrally with respect to the width of the car 100 in the embodiment being described. In particular, the harness 350 is arranged to occupy the central tunnel originally designed to accommodate a prop shaft of the vehicle in this embodiment (the prop shaft being a longitudinal shaft arranged to deliver power from the engine/transmission mounted under the hood/bonnet of the vehicle 100 to the rear of the vehicle to drive the wheels). The tunnel may be referred to as a prop shaft tunnel whether or not a prop shaft is present therein. The skilled person would appreciate that a rearwardly mounted drivetrain 300 (including a rearwardly mounted motor) may avoid the need for a prop shaft. In alternative embodiments, the harness 350 may be located elsewhere in the vehicle 100, for example extending along one side of the vehicle.

The harness design may be tailored to the vehicle 100 to be modified; for example adjusting for differing vehicle lengths and/or different positions of the battery 400 relative to the drivetrain 300.

The harness 350 may allow for one-directional power flow only, from the battery 400 to the drivetrain 300, or may allow power to flow from the drivetrain 300 to the battery 400 in some embodiments, for example if regenerative braking is used. In some embodiments incorporating regenerative braking, one or more capacitors or the likes may be provided within the electric drivetrain 300 rather than using the power to recharge the battery 400. The battery 400 is contained within a battery box for safety reasons in the embodiment being described.

The electric drivetrain 300 may comprise any suitable electric motor, power electronics, connectors and other components as are known in the art.

Figure 3:
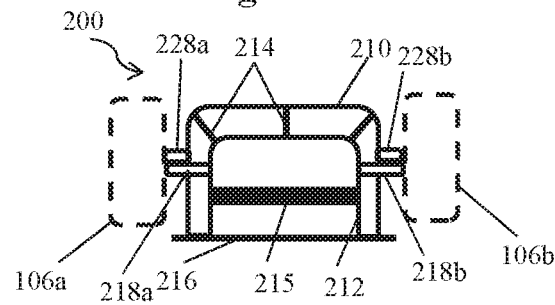
FIG. 3 is a more detailed schematic view of the sub-frame shown in FIGS. 1 and 2, with rear wheel locations marked.

A schematic view of the sub-frame 200 is shown in FIG. 3, with the rear wheel locations 106a, 106b shown in dotted lines for reference.

The sub-frame 200 comprises a cage 210 comprising interconnected bars. The bars are made of metal in the embodiment being described, although the skilled person would appreciate that other materials, such as carbon fibre composites or the likes, could be used in other embodiments (provided that suitable strength and load tolerance requirements, regarding vehicle acceleration, deceleration and impacts, and engine torque reaction, are met).

The cage 210 comprises a lower perimeter 211 and an upper perimeter 212. As used herein, the terms "upper" and "lower" refer to the intended position of the sub-frame 200 in use in an upright vehicle 100. The "upper" perimeter 212 is therefore arranged to lie closer to a roof of the vehicle 100/further from the road or other driving surface than the lower perimeter 211 when the vehicle 100 is parked or driving. The skilled person would appreciate that the sub-frame 200 and/or a vehicle 100 in which the sub-frame 200 is mounted may be rotated to any angle, and that "upper" and "lower" are referenced for clarity only, and not intended to be limiting.

A plurality of struts 214 extend between the upper and lower perimeters 212, 211, holding the perimeters 211, 212 in their relative positions.

A front face 216 is provided in a forward end region of the sub-frame 200. The front face 216 of the embodiment being described has six sides, and therefore may be described as being hexagonal. However, in this embodiment, two of the six sides are smaller than the other four sides, and effectively cut off the outer corners of what would otherwise by a trapezium-shaped face—the front face 216 may therefore also be described as trapezoidal, with its upper edge being narrower than its lower edge and the angled sides extending therebetween. In alternative embodiments, the front face may have only four sides, or may be more clearly hexagonal (having more even side lengths).

The front face 216 comprises a lower bar 216a arranged to extend parallel to the width of the vehicle 100 in use. The lower bar 216a, together with the front frame mounts 220a, 220b connected to each end thereof, forms the widest part of the sub-frame 200 in the embodiment being described. The lower bar 216a forms a part of the lower perimeter 211. A second bar 216b of the front face 216 extends between end regions of the lower bar 216a, forming the remaining five sides of the hexagonal shape. The lower bar 216a extends beyond the connection points of the upper bar 216b in the embodiments being described, providing a connection point for the front frame mounts 220 connected to each end thereof.

At each connection point of the upper bar 216b to the lower bar 216a, the upper bar 216b extends upwardly (vertically, in the orientation shown) from the lower bar 216a, at an angle of around 90° thereto, for a distance of around 30% of the sub-frame's height, H. The upper bar 216b then slopes inwards for the remaining 70% of the sub-frame's height, H. The final side of the hexagonal shape is formed by a horizontal portion of the upper bar 216b extending parallel to the lower bar 216a and joining the two sloping portions. A central bar 216c extends between the horizontal lower bar 216a and the horizontal portion of the upper bar 216b, reinforcing the front face 216.

The skilled person would appreciate that specific slope angles and lengths may vary between embodiments, and may be selected based on packaging requirements and stress requirements applicable to the vehicle 100 and drivetrain 300 in question.

In the embodiment being described, the upper perimeter 212 is formed by a central portion of the horizontal portion of the upper bar 216b and a substantially U-shaped bar extending therefrom. The upper perimeter bar 212 extends from the upper bar 216b inwardly of the bends between the sloped portions and the horizontal portion thereof, in the embodiment being described.

In the embodiment being described, the upper perimeter 212 is substantially rectangular in shape, and optionally substantially square in shape, with curved corners towards the rearward end region of the sub-frame 200.

A bar 215 extends across the upper perimeter 212, parallel to the width of the vehicle 100, reinforcing the upper perimeter 212. The bar 215 may serve to improve stress distribution within the sub-frame 200, and therefore to improve sub-frame strength. In the embodiment being described, a flat bar or strut is used for the bar 215 as opposed to the tubular bars used elsewhere in the sub-frame 200 to meet packaging requirements for a particular vehicle 100. In alternative embodiments, bars or struts with different cross-sections may be used. In alternative embodiments, no bar 215, or multiple bars 215, may extend across the upper perimeter 212. In embodiments with no cross bar 215, the perimeter bars 212 may be reinforced—for example being wider, being solid instead of hollow, or being made of a stronger material.

In the embodiment being described, the lower perimeter 211 is formed by a central portion of the horizontal lower bar 216a and a substantially U-shaped bar extending therefrom. The U-shaped bar is arranged to be connected to the front face 216 inwardly of the connection between the upper and lower bars 216a,b of the front face in the embodiment being described.

In the embodiment being described, the lower perimeter 211 widens towards the forward end region of the sub-frame 200—the "arms" of the U-shaped bar are kinked or curved to provide the widening. As a result of the widening, the lower perimeter 211 may be thought of as at least substantially trapezoidal, with its forward edge being longer than its rearward edge. In the embodiment being described, the forward edge of the lower perimeter 211 is parallel to and longer than the upper perimeter's forward edge, and the rearward edge of the lower perimeter 211 is parallel to and at least substantially the same length as the upper perimeter's rearward edge. In the embodiment being described, the forward edges of the upper and lower perimeters are in the same vertical plane (when the sub-frame 200 is arranged horizontally/in the orientation shown), whereas the rearward edge of the upper perimeter 212 is forward of the rearward edge of the lower perimeter 211—i.e. the rearward edges are vertically offset from each other in the orientation shown.

In the embodiment being described, the lower perimeter 211 is wider than the upper perimeter 212, and extends further rearward than the lower perimeter 211. The front face 216 provides co-planar front edges for both perimeters 211, 212. The struts 214 extending between the upper and lower perimeters 212, 211 (not including any struts 216c in the front face 216) are therefore angled inwards in the embodiment being described.

In the embodiment being described, most of the bars/struts of the cage 210 are at least substantially cylindrical, having round cross-sections. However, the bar 215 extending across the upper perimeter 212 is flatter and more cuboid in cross-section in the embodiment being described, for packaging reasons—this may vary in other embodiments.

In the embodiment being described, most of the bars of the cage 210 are hollow, which was found to provide sufficient strength without adding unnecessary weight. In particular, 38 mm diameter steel tubing (E235/E355 Steel Tube) was used for the bars of the embodiment being described; the skilled person would appreciate that other dimensions and/or materials may be used in other embodiments.

In alternative or additional embodiments, solid bars may be used.

In the embodiment being described, S275/S355 Steel Plate and EN3B steel machined parts were used for other sub-frame 200 components. The skilled person would appreciate that other dimensions and/or materials may be used in other embodiments.

The sub-frame 200 comprises a pair of rear wheel suspension mounts 208a, 208b, each rear wheel suspension mount being arranged to have one of the rear wheels 106a, 106b of the car 100 mounted thereon. A suspension assembly 600 (shown in FIG. 6) for each wheel 106a, 106b is arranged to be connected to the respective rear wheel suspension mount 208a, 208b, and the wheel 106a, 106b mounted on the respective suspension assembly 600.

In the embodiment being described, the suspension assembly 600 comprises an upper control arm 602 and a lower control arm 604. An off-the-shelf suspension assembly 600 suitable for the vehicle 100 to be modified may be used. Each rear wheel suspension mount 208a, 208b therefore comprises an upper control arm mounting point 218a, 218b and a lower control arm mounting point 228a, 228b. In other embodiments, different styles of suspension assembly 600 may be used—for example leaf spring arrangements, which may not comprise upper and lower control arms. Different suspension mounts 208a, 208b may be provided on the sub-frame 200 accordingly, in such embodiments.

In the embodiment being described, each upper control arm mounting point 218a, 218b is located on the upper perimeter 212 of the cage in the embodiment being described, and is arranged to have the upper control arm 602 of one of the pair of rear suspension mounts 600 rotatably attached thereto. The upper control arm mounting point 218a, 218b extends outwardly from a rearward portion of the right or left side (respectively) of the upper perimeter 212, and towards its respective right or left wheel location. As defined herein, "left" and "right" are from the perspective of a person sitting within the car 100, and facing forwards.

Each lower control arm mounting point 228a, 228b is located on the lower perimeter 210 of the cage in the embodiment being described, and is arranged to have a lower control arm 604 of the one of the pair of rear suspension mounts 600 rotatably attached thereto. In the embodiment being described, each lower control arm 604 is arranged to be mounted at two positions—front and rear lower control arm mounting points 228a, 228b are therefore provided on each side. Each lower control arm mounting point 228a, 228b takes the form of a rearward bracket 228 mounted on a rearward portion of the right or left side (respectively) of the lower perimeter 210, and directed outwards towards its respective wheel location (i.e. rightwards for the right-hand side bracket 228a and leftwards for the left-hand side bracket 228b), and a forward bracket 228 located further forward on the right or left side (respectively) of the lower perimeter 211, and directed towards its respective wheel location. In the embodiment being described, the lower perimeter 211 widens between the rearward bracket 228 and the forward bracket 228—the forward bracket 228 therefore extends inwardly from the lower perimeter 211 whereas the rearward bracket extends outwardly from the lower perimeter 211, providing mounting points in a line parallel to the vehicle's length.

Each mounting point is provided with a bushing to provide an interface between the suspension 600 and the sub-frame 200, damping the energy transmitted through the mounting point. Rubber bushes are used in the embodiment being described; the skilled person would appreciate that bushes of a different material, and/or an alternative form of damper, may be used in other embodiments.

In alternative embodiments, other suspension designs may be used and the rear wheel suspension mount design present on the sub-frame 200 may be varied accordingly.

The sub-frame 200 further comprises a plurality of brackets arranged to facilitate connection of the sub-frame 200 to the chassis 102 of the classic car 100, and/or of the sub-frame 200 to the electric drivetrain 300.

In particular, in the embodiment being described the sub-frame 200 comprises a pair of front frame mounts 220, one mounted on each end of the lower bar 216a of the front face 216 of the sub-frame. In the embodiment being described, each front frame mount 220 comprises a bracket 220 with a connector 222 connected thereto; the connector 222 is bolted to the bracket 220 in the embodiment being described, although the skilled person would appreciate that other connection methods may be used in other embodiments, and/or that the connector 222 may be integral with the bracket 220 in some embodiments. The use of a disconnectable connector 222 may facilitate adjustment and/or replacement to better fit with different chassis designs. The sub-frame 220 may be provided without the connector 222 in some embodiments.

The connector 222 comprises a bushing, and in particular a rubber bush arranged to dampen force transfer between the chassis 102 and the sub-frame 200, in the embodiment being described. Bushes of a different material, and/or an alternative form of damper, may be used in other embodiments.

Each front frame mount 220 is arranged to be connected to the chassis 102, so mounting the sub-frame 200 onto the chassis 102. More specifically, in the embodiment being described each front frame mount 220 is arranged to be connected to the car's under body (to the ladder frame in ladder frame chassis designs, or to a lower portion of a unibody design chassis in the example shown in FIG. 7) in a location forward of the rear wheels 106. For cars 100 originally designed to take a leaf-spring suspension assembly for the rear wheels, the same, or a similar, location to the original front leaf spring attachment may be used, as is shown in FIG. 7.

The outer edge of each front frame mount 220 provides the widest span of the sub-frame 200 in the embodiment being described.

In the embodiment being described the sub-frame 200 further comprises a pair of rear side frame mounts 230. The rear side frame mounts 230 extend from the upper perimeter 212 of the sub-frame 200, adjacent and vertically aligned with the upper control arm mounting points 218, and are each arranged to mount the sub-frame to a side rail of the unibody chassis 102 shown in FIG. 7. In ladder-frame chassis vehicles, side rails of the ladder frame generally sweep up and the down over the rear axle; the sub-frame 200 may therefore be mounted to the ladder frame on the lower perimeter at the front and on the upper perimeter at a more rearward point level with or near the rear axle, in a similar fashion to that described for the sub-frame 200 of the current embodiment.

In the embodiment being described the sub-frame 200 further comprises a pair of front side frame mounts 235. The front side frame mounts 235 are each provided by a rail 235 extending between the lower and upper perimeters 211, 212 of the sub-frame 200, and are arranged to mount the sub-frame to a side rail of the unibody chassis 102 shown in FIG. 7. In the embodiment being described, each front side frame mount 235 is arranged to be connected to a connection point on the chassis 102 otherwise used for a lever arm damper for rear wheel suspension (where available)—as the sub-frame 200 now provides the mountings 208 for the suspension 600, this connection point is not needed for the suspension and is available for mounting the sub-frame 200. In the embodiment being described, the front side frame mounts 235 each comprise a plate 235 and a pair of bolts 236 arranged to secure the side rail to the plate, for example using the bolt holes provided through the side rail for the lever arm damper (bolt holes may alternatively be introduced at a suitable location). A different or additional connector, and/or a different number of bolts 236, may be used in other embodiments. In ladder-frame chassis embodiments, the front side frame mounts 235 may be provided on the lower perimeter 211 instead.

Each side frame mount 230, 235 again comprises a bushing, and in particular a rubber bush arranged to dampen force transfer between the chassis 102 and the sub-frame 200. Bushes of a different material, and/or an alternative form of damper, may be used in other embodiments.

Precise positions of the brackets 220, 230, 235 used to secure the sub-frame 200 to the chassis 102 may be different in other embodiments—the sub-frame 200 may thereby be adapted to the chassis of various different car designs, with the brackets 220, 230, 235 being positioned to take advantage of pre-existing suitable connection points where available.

In the embodiment being described, the sub-frame 200 further comprises a rearward drivetrain mounting bracket 240. The rearward drivetrain mounting bracket 240 may also be referred to as an engine torque reaction bracket as it serves to connect the electrical drivetrain 300 to the sub-frame 200, and to react the torque generated by the drivetrain 300.

In the embodiment being described, the rearward drivetrain mounting bracket 240 is mounted on the rearward portion of the lower perimeter 211, towards the left-hand side thereof, and more specifically between a central strut 214 between the upper and lower perimeters 211, 212 and the left lower control arm mounting point 228b. In alternative or additional embodiments, a plurality of rearward drivetrain mounting brackets 240 may be provided, and/or a rearward drivetrain mounting bracket 240 may be differently positioned.

In the embodiment being described, the sub-frame 200 further comprises two forward drivetrain mounting brackets 250. The forward drivetrain mounting brackets 250 may also be referred to as engine torque reaction brackets, as they similarly serve to connect the electrical drivetrain/engine to the sub-frame 200, and to react the torque generated by the engine.

In the embodiment being described, a first forward drivetrain mounting bracket 250a is mounted on the upper bar 216b of the front face, towards the right-hand side thereof, and more specifically between a central strut 216c between the upper and lower perimeters 211, 212 and the right-hand front frame mount 220a. In the embodiment being described, a second forward drivetrain mounting bracket 250b is mounted on the upper bar 216b of the front face, towards the left-hand side thereof, and more specifically between the central strut 216c between the upper and lower perimeters 211, 212 and the left-hand front frame mount 220b. In alternative or additional embodiments, only one, or more than two, forward drivetrain mounting brackets 250 may be provided, and/or one or more forward drivetrain mounting brackets 250 may be differently positioned—for example, in embodiments in which the rearward drivetrain mounting bracket 240 is on the right-hand side, a single forward drivetrain mounting bracket 250 may be on the left hand side.

The forward drivetrain mounting brackets 250 and the rearward drivetrain mounting bracket 240 are each arranged to be mounted to a main casing of the electric drivetrain 300 in the embodiment being described. In the embodiment being described, a total of three mounting points are provided between the electric drivetrain 300 and the sub-frame 200; these are provided by the forward and rearward drivetrain mounting brackets 250, 240.

Figure 4:
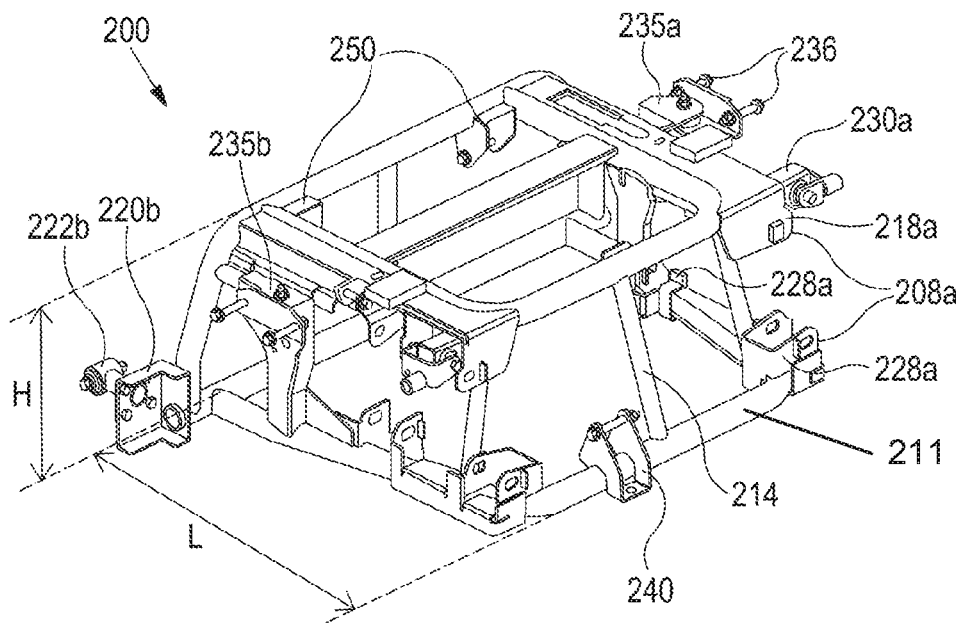
FIG. 4 is a rear perspective view of a sub-frame of an embodiment.
Figure 6:
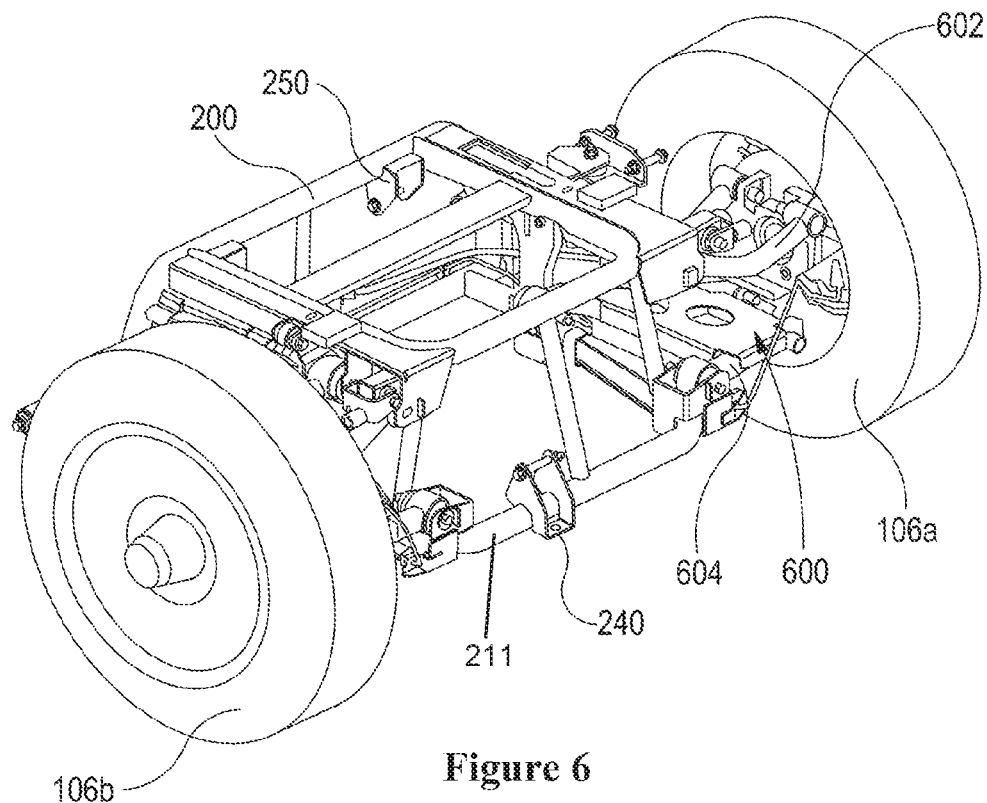
FIG. 6 is a rear perspective view of a sub-frame of an embodiment, with the rear wheels and rear wheel suspension mounted thereon.

As can be seen in FIGS. 4 and 6, the left and right sides of the sub-frame 200 of the embodiment being described are not symmetrical. The asymmetrical sub-frame 200 accommodates an asymmetrical powertrain, which includes power cables 310 on one side only in the embodiment being described.

In the embodiment being described, a slot 270 is provided on the right-hand side of the upper perimeter 212. The slot 270 is arranged to allow a main power cable from an inverter of the drivetrain to the motor of the drivetrain 300 to pass through the sub-frame 200. In alternative embodiments, the slot 270 may be differently located, or not present, depending on drivetrain geometry.

In alternative embodiments, the powertrain may be symmetrical and/or the sub-frame 200 may be symmetrical.

The sub-frame 200 of the embodiment being described further comprises a plurality of base plate mounts 280. In the embodiment being described, three base plate mounts 280 are provided extending forward from the lower bar 216a of the front face 216, and a lower portion of the rearward drivetrain mounting bracket 240 provides a fourth base plate mount 240 at the rear of the sub-frame 200. Each base plate mount 280 comprises a plate with a bolt hole therethrough, and a bolt passing therethrough. Alternative connectors may be used instead of, or as well as, bolts in other embodiments.

As shown in FIGS. 9A to 12B, a base plate 290 may be connected across the sub-frame 200, forming a lower surface or base for the sub-frame 200. The base plate 290 of such embodiments is arranged to lie below the electric drivetrain 300 in use. The base plate 300 may serve to protect the electric drivetrain 300, for example from stones or splashes from below, and/or may increase stiffness of the sub-frame 200.

In the embodiment being described, the base plate 290 does not support any of the weight of the drivetrain 300; the drivetrain is suspended above the base plate 290 by the brackets 240, 250. In alternative embodiments, the base plate 290 may support some of the weight of the electric drivetrain 300—the electric drivetrain 300 may rest on the base plate 290 in some embodiments.

The base plate 290 may also serve to catch or contain dropped components such as nuts or bolts, for example during servicing.

Figure 5:
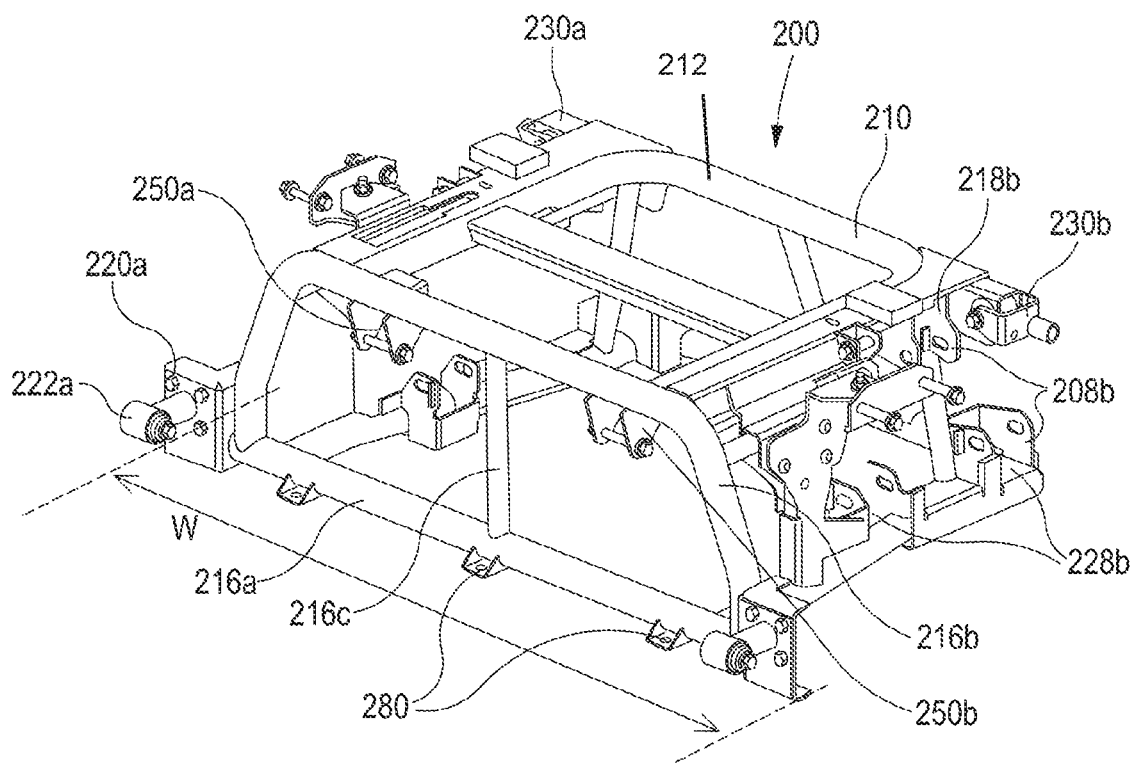
FIG. 5 is a front perspective view of a sub-frame of an embodiment.

FIGS. 4 and 5 illustrate various dimensions of the sub-frame 200. The sub-frame 200 has a length, L, arranged to be parallel to the length of the car 100 within which it is mounted in use. The length, L, is less than 675 mm and more than 200 mm in the embodiment being described, and optionally is 650 mm. In alternative embodiments, the length may be between 637 mm and 300 mm.

The sub-frame 200 has a width, W, arranged to be parallel to the width of the car 100 within which it is mounted in use, and perpendicular to the length. The width of the sub-frame 200 decreases from front to back in the embodiment being described. The width, W, of the sub-frame 200 at its widest point (from the right-most edge of the right-hand front frame mount 220a to the left-most edge of the left-hand front frame mount 220b) is less than 1025 mm and more than 300 mm in the embodiment being described, and optionally less than 1018 mm. The width, W, is 1000 mm in the embodiment being described.

The width, W, of the sub-frame 200 at its narrowest point (from the left-most edge of the left-hand lower control arm mounting point 228b to the right-most edge of the right-hand lower control arm mounting point 228a) is less than 1000 mm and more than 250 mm in the embodiment being described. In the embodiment being described, the sub-frame 200 is narrower towards the rear than it is at the front of the sub-frame.

The height, H, of the sub-frame 200, measured between the level of the top of the upper perimeter bars 212 and the level of the bottom of the lower perimeter bars 211, is constant in the embodiment being described. One or more brackets may protrude above or below these levels, to an extent that may vary with chassis design. The height, H, of the sub-frame 200 is less than 325 mm and more than 100 mm in the embodiment being described, and optionally less than 308 mm. The height, H, is 300 mm in the embodiment being described.

The skilled person would appreciate that, whilst some dimensions are provided above for ease of understanding and visualisation, the dimensions may vary widely between different embodiments and are provided by way of example only. In particular, the dimensions of the sub-frame 200 may be selected based on the shape, height, width and length of the original vehicle and the shape, height, width and length of the electric drivetrain 300 chosen for the vehicle.

The sub-frame designs 200 as described herein are arranged to be mounted within an un-modified car body; fitting with both the chassis 102 and other components such that the outward appearance of the car 100 is unaltered. For example, the sub-frame 200 of various embodiments is arranged to fit into bodyshells provided by British Motor Heritage Limited without any modifications (or with just addition of holes for bolts or the likes) being necessary to the bodyshell (see http://www.bmh-ltd.com/bodyshells.htm).

New electric cars 100 in the "classic" style may therefore be made using the same chassis 102 and/or bodyshell, and such cars originally configured to run on an internal combustion engine may be converted into electric vehicles 100 without changing the outward appearance. In particular, the skilled person would appreciate that the sub-frame 200 allows the electric drive components to be mounted in a rear region of the vehicle 100, so allowing sufficient space for the battery 400 towards the front of the vehicle 100 without raising it.

Figures 11A, 11B:
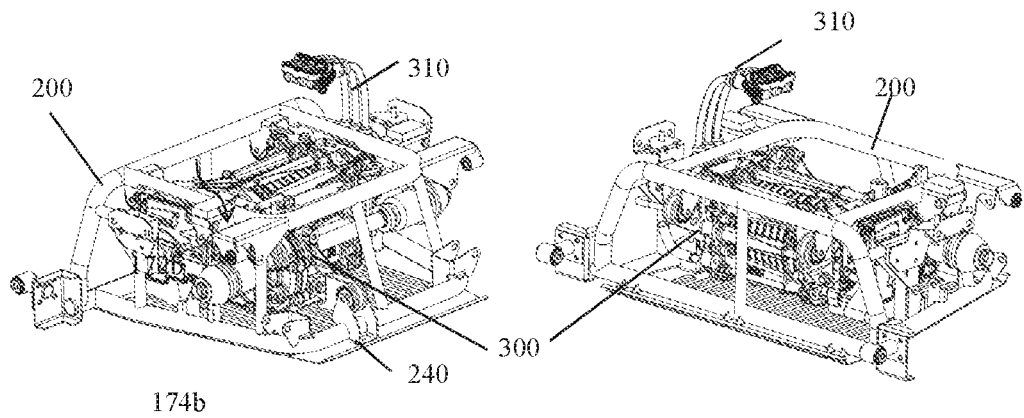
FIGS. 11A and 11B are perspective views of a sub-frame of FIGS. 9A and 9B, with an electric drivetrain mounted thereon.
Figure 12A:
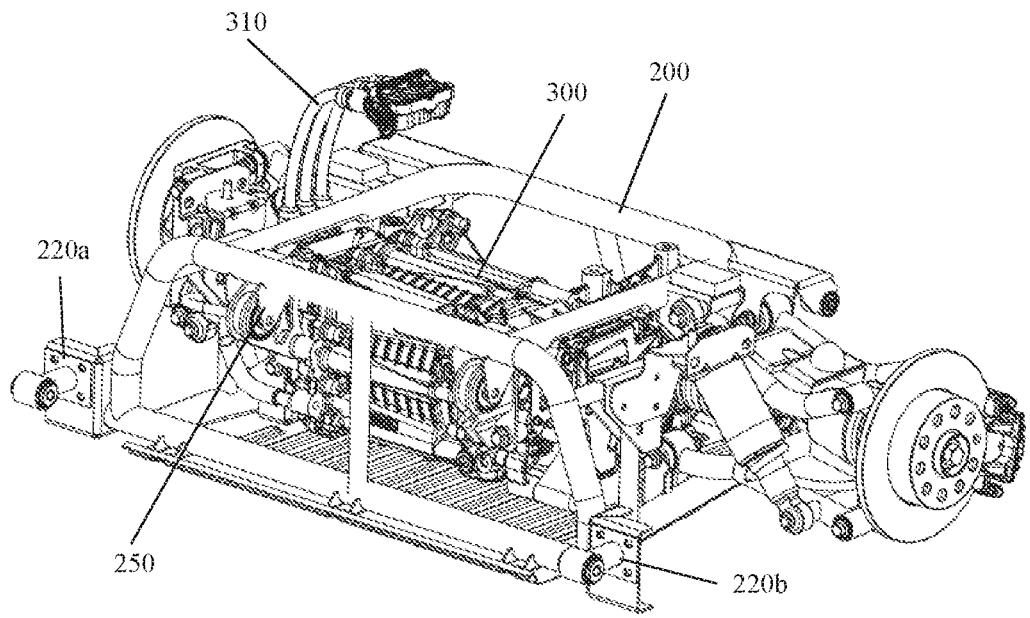
FIGS. 12A and 12B are perspective views of a sub-frame of FIGS. 9A and 9B, with a rear wheel suspension and mounting assembly and an electric drivetrain mounted thereon.
Figure 12B:
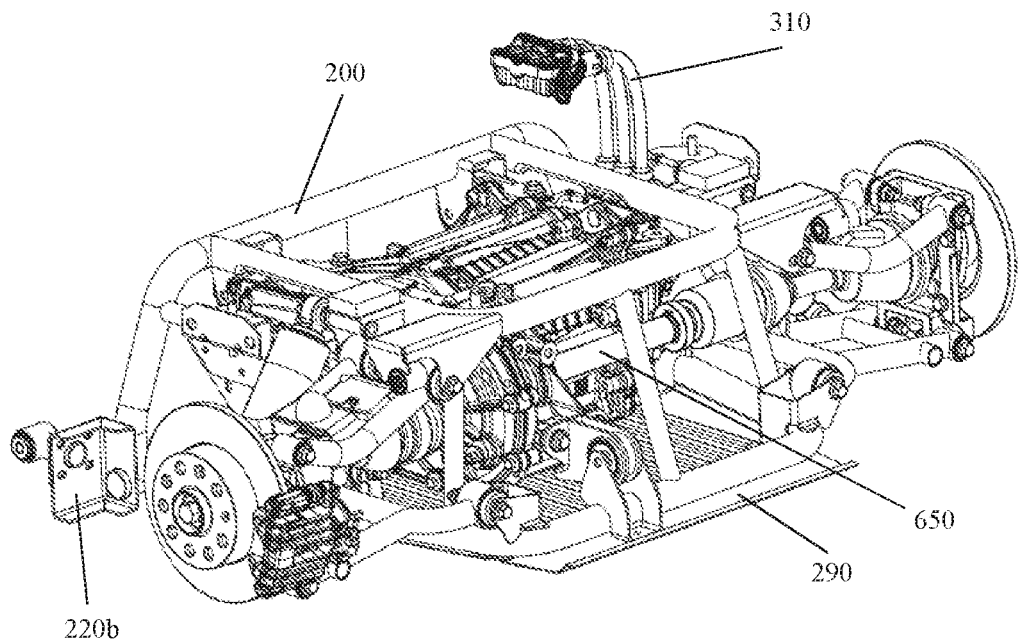
Figure 13:
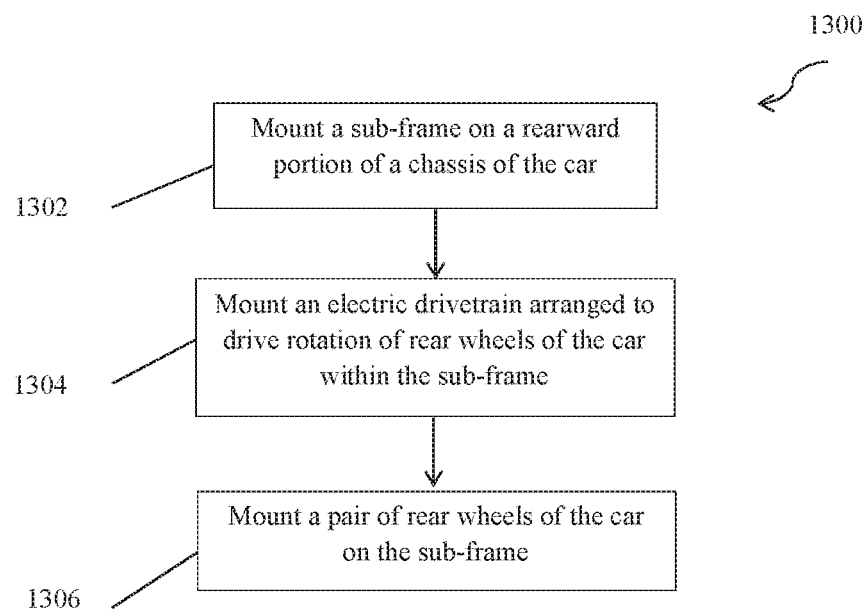
FIG. 13 illustrates a method of an embodiment.

A method 1300 of retrofitting a non-electric car 100, e.g. a petrol or diesel car, to make the car 100 into an electric car is illustrated in FIG. 11. The skilled person would appreciate that this method 1300 may be applied to a car 100 which has previously had an internal combustion engine therein, or to a car bodyshell or chassis 102 which has never had an internal combustion engine therein, but which was designed with an internal combustion engine as the intended power source. The method 1300 may therefore be applied to new-build cars 100 or to cars 100 previously fitted with an internal combustion engine (e.g. second hand cars, or cars with a single owner who wishes to change the power source).

The method 1300 comprises mounting 1302 a sub-frame 200 on a rearward portion of a chassis 102 of the car 100. The mounting 1302 of the sub-frame may comprise securing the sub-frame 200 to the chassis 102 using one or more brackets on the sub-frame. The mounting 1302 of the sub-frame may comprise securing the sub-frame 200 to the chassis 102 using one-or more pre-existing mounts/connection points on the chassis 102. For example, a mount on the chassis 102 originally intended to receive a leaf spring or other suspension assembly 600 for a wheel may instead be connected to a bracket of the sub-frame 200.

The method 1300 comprises mounting 1304 an electric drivetrain 300 arranged to drive rotation of rear wheels 106 of the car 100 within the sub-frame 200. The mounting the electric drivetrain 300 may comprise securing the electric drivetrain 300 to the sub-frame 200 using one or more brackets on the sub-frame.

In various embodiments, the method 1300 may further comprise mounting 1306 a pair of rear wheels 106 of the car 100 on the sub-frame 200. The mounting may be direct or indirect—for example being via a separate suspension assembly 600, the suspension assembly 600 being mounted on a rear wheel suspension mount 208 of the sub-frame 200. In alternative embodiments, the car 100 may be provided without rear wheels 106—these may be added by a third party before use.

In various embodiments, the method 1300 may further comprise mounting a battery 400 in the car 100 and connecting the battery 400 to the electric drivetrain 300 so as to power the drivetrain. The battery 400 may be mounted in a forward portion of the vehicle 100; for example under the bonnet (hood) of the car 100, and/or adjacent the front wheels 104. The battery 400 may be connected to the electric drivetrain 300 by means of a harness 350.

Spatially separating the battery 400 from the drivetrain 300 may facilitate retrofitting the drivetrain 300 within the car 100 without affecting the outward dimensions of the car, as described above.

In various embodiments, the battery 400 may be mounted in a position originally occupied by, or intended to be occupied by, an internal combustion engine (engine block).

The method 1300 may allow a car 100 to be converted from a petrol- or diesel-powered engine to an electric drivetrain 300 without significantly affecting the outward appearance, for example keeping some or all of the below parameters constant:

wheel base;
track;
ride height;
width;
overall height distribution; and
overall weight distribution.

The invention claimed is:

1. A sub-frame arranged to be mounted on a chassis of a car and to have the rear wheels of the car mounted thereon, the sub-frame being arranged to receive an electric drivetrain arranged to drive the car, the sub-frame comprising:
   a cage comprising bars arranged to form an upper perimeter and a lower perimeter and a plurality of struts extending between the upper and lower perimeters;
   a pair of rear wheel suspension mounts, each rear wheel suspension mount being arranged to have one of the rear wheels of the car mounted thereon; and
   a plurality of brackets located on the cage and arranged to facilitate connection of the sub-frame to the chassis of the car and to the electric drivetrain;
   wherein the plurality of brackets located on the cage comprise:
   a pair of front frame mounts extending forward from a front face of the sub-frame, and arranged to be connected to an underbody portion of the chassis;
   a pair of rear side frame mounts extending sideways from a rearward portion of the sub-frame and arranged to be connected to side rails of the chassis; and
   a pair of front side frame mounts located forward of the rear side frame mounts, extending sideways from the sub-frame, and arranged to be connected to the side rails of the chassis.

2. The sub-frame of claim 1, wherein each rear wheel suspension mount comprises:
   an upper control arm mounting point on the upper perimeter of the cage, the upper control arm mounting point arranged to have an upper control arm of a rear suspension assembly rotatably attached thereto; and a lower control arm mounting point on the lower perimeter of the cage, the lower control arm mounting point arranged to have a lower control arm of the rear suspension assembly rotatably attached thereto.

3. The sub-frame of claim 2, wherein each control arm mounting point comprises a rubber bushing arranged to provide an interface between a metal part of the control arm mounting point and the control arm whilst allowing relative rotation.

4. The sub-frame of claim 1, wherein each front frame mount is arranged to be connected to the underbody portion of the chassis in a front leaf spring attachment location.

5. The sub-frame of claim 1, wherein each mount comprises, or is arranged to receive, a bushing, so as to provide a bushed connection between the sub-frame and the chassis.

6. The sub-frame of claim 1, wherein the plurality of brackets located on the cage comprise:
a rearward drivetrain mounting bracket extending from a rearward portion of the cage and arranged to have the electric drivetrain connected thereto; and
a forward drivetrain mounting bracket extending from a forward portion of the cage and arranged to have the electric drivetrain connected thereto.

7. The sub-frame of claim 1, wherein:
(i) the sub-frame has a forward portion and a rearward portion, and wherein the width of the sub-frame in its forward portion is less than 1025 mm and more than 300 mm; and
(ii) the sub-frame has a height, between the top of the upper perimeter bars and the bottom of the lower perimeter bars, of less than 325 mm and more than 100 mm; and
(iii) the sub-frame has a forward portion and a rearward portion, and wherein the sub-frame has a length, between the front of the forward portion and the rear of the rearward portion, of less than 675 mm and more than 200 mm.

8. The sub-frame of claim 1, wherein the upper perimeter is at least substantially square, and wherein the lower perimeter is at least substantially trapezoidal, with its forward edge being parallel to and longer than the upper perimeter's forward edge, and its rearward edge being parallel to and at least substantially the same length as the upper perimeter's rearward edge.

9. The sub-frame of claim 1, wherein forward edges of the upper and lower perimeters are vertically aligned, and rearward edges of the upper and lower perimeters are vertically offset due to the lower perimeter extending further rearward than the upper perimeter.

10. A frame for a car, comprising:
a chassis comprising a pair of front suspension mounts each arranged to have a front wheel mounted thereon; and
a sub-frame mounted on the chassis and comprising a pair of rear suspension mounts each arranged to have a rear wheel mounted thereon, the sub-frame extending between the rear suspension mounts and being arranged to receive an electric drivetrain arranged to drive rotation of the rear wheels, wherein the sub-frame is the sub-frame of claim 1.

11. The frame of claim 10, wherein the chassis is a unibody chassis.

12. A car comprising:
a chassis;
a pair of front wheels mounted on the chassis;
a sub-frame mounted on the chassis, wherein the sub-frame is the sub-frame of claim 1;
a pair of rear wheels mounted on the sub-frame, the sub-frame extending between the rear wheels;
an electric drivetrain mounted on the sub-frame and arranged to drive rotation of the pair of rear wheels; and
a battery connected to, and arranged to power, the electric drivetrain.

13. The car of claim 12, wherein the battery is mounted on a forward region of the chassis.

14. The car of claim 12, further comprising a harness connecting the battery to the electric drivetrain, and wherein the harness is arranged to extend through a prop shaft tunnel of the car.

15. A method of retro-fitting a petrol or diesel car with an electric drivetrain, the method comprising:
mounting a sub-frame, wherein the sub-frame is the sub-frame of claim 1, on a rearward portion of a chassis of the car, the mounting comprising using a plurality of brackets located on the cage of the sub-frame to connect the sub-frame to the chassis of the car, and in particular comprising:
connecting the pair of front frame mounts extending forward from the front face of the sub-frame to an underbody portion of the chassis;
connecting the pair of rear side frame mounts extending sideways from the rearward portion of the sub-frame to side rails of the chassis; and
connecting the pair of front side frame mounts located forward of the rear side frame mounts, extending sideways from the sub-frame to the side rails of the chassis; and
mounting an electric drivetrain arranged to drive rotation of rear wheels of the car within the sub-frame.

16. The method of claim 15 further comprising mounting a rear wheel of the car on each rear wheel suspension mount of the sub-frame via a respective suspension assembly.

17. The method of claim 15, wherein the method further comprises:
mounting a battery on a forward portion of the chassis of the car; and
connecting the battery to the electric drivetrain such that the battery powers the electric drivetrain.

\* \* \* \* \*